T. H. COOK.
SAVINGS DEPOSIT ACCOUNT DEVICE.
APPLICATION FILED APR. 29, 1915.
1,207,714.
Patented Dec. 12, 1916.
3 SHEETS—SHEET 1.
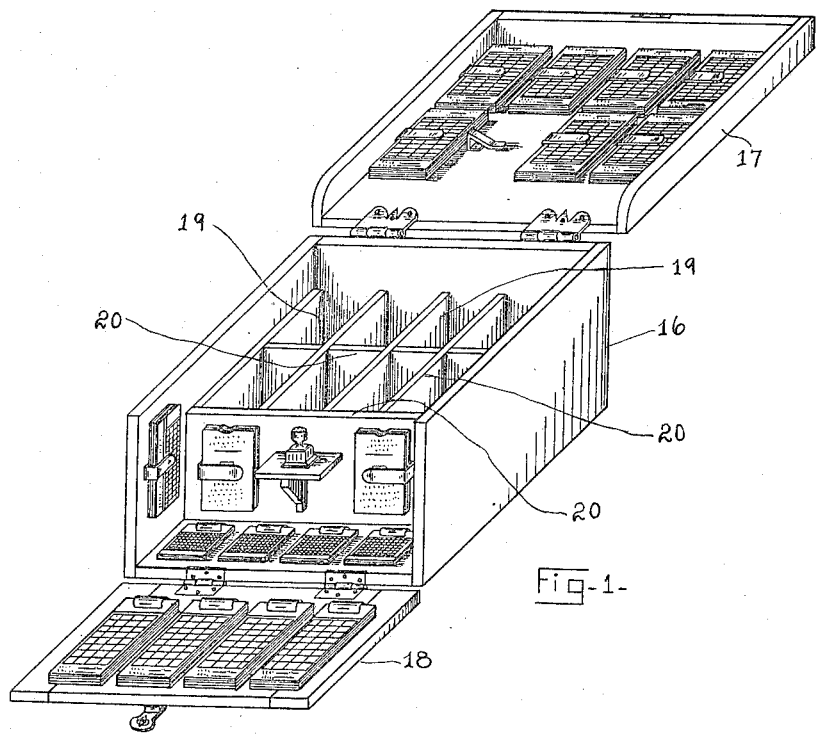
Fig-1-
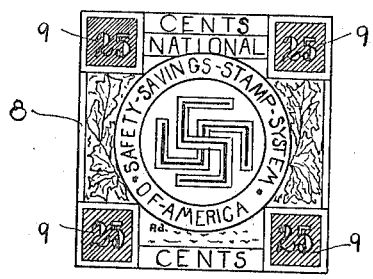
Fig-2-
Inventor:
THOMAS H. COOK,
By Harold C. Shipman
Attorney.

T. H. COOK.
SAVINGS DEPOSIT ACCOUNT DEVICE.
APPLICATION FILED APR. 29, 1915.

1,207,714.

Patented Dec. 12, 1916.
3 SHEETS—SHEET 2.

SERIES _____
NATIONAL
SAFETY SAVINGS STAMP SYSTEM
CUSTOMERS CARD

| 1 | 2 | 3 | 4 |
|---|---|---|---|
| 5 | 6 | 7 | 8 |
| 9 | 10 | 11 | 12 |
| 13 | 14 | 15 | 16 |
| 17 | 18 | 19 | 22 |
| 21 | 22 | 23 | 24 |
| 25 | 26 | 27 | 28 |
| 29 | 30 | 31 | 32 |
| 33 | 34 | 35 | 36 |
| 37 | 38 | 39 | 40 |

RETIRED _____ $ __
SIGNATURE _____

Fig. 3.

SERIES _____ =50
NATIONAL
SAFETY SAVINGS STAMP SYSTEM
REGISTER CARD

| 1 | 2 | 3 | 4 |
|---|---|---|---|
| 5 | 6 | 7 | 8 |
| 9 | 10 | 11 | 12 |
| 13 | 14 | 15 | 16 |
| 17 | 18 | 19 | 20 |
| 21 | 22 | 23 | 24 |
| 25 | 26 | 27 | 28 |
| 29 | 30 | 31 | 32 |
| 33 | 34 | 35 | 36 |
| 37 | 38 | 39 | 40 |

SIGNATURE _____
ADDRESS _____
OCCUPATION _____
A_C_M_S_I _____

Fig. 4.

Inventor:
THOMAS H. COOK,
By Harold C. Shipman
Attorney.

T. H. COOK.
SAVINGS DEPOSIT ACCOUNT DEVICE.
APPLICATION FILED APR. 29, 1915.

1,207,714.

Patented Dec. 12, 1916.
3 SHEETS—SHEET 3.

Inventor:
THOMAS H. COOK.
By Harold C. Shipman
Attorney.

UNITED STATES PATENT OFFICE.

THOMAS HENRY COOK, OF SARNIA, ONTARIO, CANADA.

SAVINGS-DEPOSIT-ACCOUNT DEVICE.

1,207,714.  Specification of Letters Patent.  Patented Dec. 12, 1916.

Application filed April 29, 1915. Serial No. 24,837.

*To all whom it may concern:*

Be it known that I, THOMAS H. COOK, a citizen of the Dominion of Canada, residing at Sarnia, in the county of Lambton, Province of Ontario, Canada, have invented certain new and useful Improvements in Savings-Deposit-Account Devices, of which the following is a specification.

This invention relates to a savings deposit account cabinet for banks or other savings institutions.

This invention consists of a portable case, a series of stamps of various colors and denominations and a number of different kinds of form cards, which are all used in connection with the cabinet.

The object of the invention is to provide a savings deposit account system which will greatly simplify the keeping, conducting and regulating of this system for banks and other savings institutions.

With this and other objects in view, the invention consists of a portable case, a series of stamps, cards and envelops used in combination together as hereinafter more fully described and claimed, having reference to the accompanying drawings.

In describing the invention in detail, reference will be had to the accompanying drawings wherein like characters of reference denote corresponding parts in the several views, and in which,—

Figure 1 is a perspective view of portable cases. Fig. 2 is the design of one of the stamps used in this cabinet. Fig. 3 is the design of the customer's card used in this cabinet. Fig. 4 is the design of the register card used in this cabinet. Fig. 5 is the design of the daily record card used in this cabinet. Fig. 6 is the design of the envelop used in this cabinet. Fig. 7 is the design of the order form used in this cabinet.

Referring more particularly to the drawings Fig. 2 shows the design of the stamp 8 as used and these stamps are printed or lithographed on gummed paper. The paper is of various colors. Each color is to help the users to readily discriminate the value of the stamps. In each square 9, in each corner the value of the stamp is shown in figures and between the square between the two lower corners is the word "Cents" or "Dollars." In Fig. 2, the stamp is designed to show a value of twenty-five cents. Any suitable reading matter may be printed or otherwise displayed on the stamps. These stamps may be put up in perforated sheets and may have a stub suitably printed for writing in particulars about the sheet of stamps.

The customers' cards 10 as shown in Fig. 3 are printed, each having a suitable heading and under which is a number of squares. Each square is numbered starting at the top left hand corner and going toward the right. The numbers run consecutively from one up to the number of squares that are printed on the customer's card. These squares are the size of the stamp 8. The customers' cards are preferably printed on cardboard and of a similar color to that of the gummed stamps that are issued for that particular card. Each customer's card shall have a space thereon for the signature of the customer, as evidence of cancellation, surrender or repayment of the amount due the customer. There shall also be such other spaces, marks, designs or lettering as may be necessary or expedient.

Referring more particularly to Fig. 4, the design of the bank register card 11 is shown which is the record card for the bank or savings institution and will show the number and value of the stamps 8 issued and outstanding, also the number and value of the stamps attached to the customer's card. The series number of register card 11 is to be identical with the number on the customer's card and to represent the color and value of the stamps issued to the customer. For the sake of uniformity, the register card 11 may also be of similar color as the gummed stamps issued and attached to the customer's card 10 used in connection with the particular register card 11. The register cards are each divided in spaces and these spaces will be consecutively numbered from one to the number of spaces made. The register cards shall have a signature space for the customer, as a means of identification, together with other spaces for address, occupation and such other spaces as may be necessary for complete information and identification.

Referring more particularly to Fig. 5, which shows the design of the daily record 12 as used in this system, the daily record is for the use of the bank or savings institution for keeping of a daily record of the cards and stamps of various numbers, values, and colors, as they are issued and impressed with the dates. This daily record form 12 is preferably printed on cardboard and is spaced by series of upright lines and certain cross lines. It provides a signature space for certifying as to the correctness of the entries.

Referring more particularly to Fig. 6 the design of the envelop 14 or holder for the customer's card 10 is shown. The envelop protects the customer's card against wear and tear and shall have printed on it such designs, marks, lettering or wording as will intelligently convey the uses of the same.

Referring more particularly to Fig. 7 the design of the order form 15, this form is printed so as to have various spaces to indicate the required number of the various cards, stamps or such other equipment as the bank or saving institution may require.

Referring more particularly to Fig. 1 the preferred design of the portable cabinet 16 is shown which has a top 17 and a hinged side 18. This cabinet 16 is intended to hold the cards, stamps, forms, other articles and equipment. The cabinet 16 is divided into compartments 19 by partitions 20 to separate cards of different colors and values. In the top 17 a number of keepers are provided for holding any surplus supply of unused cards. The hinged front side 18 is also provided with a number of keepers and the large compartment in the front, provides a place for the various gummed stamps, blank forms, rubber stamps, pads and other equipment required. The top 17 is provided with a lock, the hasp of which engages fasteners in the top of the front side 18.

In the use of my improved cabinet, a customer is issued a customer's card 10 and a certain number of stamps 8, also, an envelop 14. As deposits are made in the bank, stamps to the amount of the deposit are attached to the customer's card and when deposited, are canceled by the bank or savings institution by impressing thereon a suitable dater or marker as may be desired. As the gummed stamps are issued and attached to the individual spaces of the customer's card 10, similarly each corresponding space on the bank's register card will be stamped with date of such transaction.

The use of the cabinet will be easily and quickly understood. It has been designed to encourage the saving of money in small amounts. The accounting of all transactions will be simplified. The use of the cabinet will appeal to the customer, increasing the desire to continue saving and reducing the inclination to withdraw by check amounts that are deposited. Customers will get into a habit of trying to put on so many stamps a week or month as the case may be, but in the long run, will get a habit of thrift and saving that the present systems of savings accounts do not encourage.

When the customer's card is completed, he has certain options to withdraw it, let it remain and draw interest or transfer it into an interest bearing account.

Many small variations may be made in making up the stamps, envelop and printed cards referred to in the above specifications. Thus, I do not want to limit myself to the illustration as shown in the drawings.

Having thus described my invention, what I claim and desire to secure by Letters Patent is—

A savings deposit account device including a plurality of sets of gummed stamps, the stamps of each set being of a distinctive color and value, depositors' cards divided into rows of consecutively numbered spaces of a size to receive the said stamps, said depositors' cards corresponding in color to the sets of stamps and having a signature line at the bottom, and bank register cards corresponding in color with the stamps and the depositors' cards and divided into consecutively numbered spaces corresponding in number with the spaces of the depositors' cards, said bank register cards having signature and identification lines, the said stamps being adapted to be applied to the depositors' cards and to be canceled by the bank and the spaces of the bank register card being adapted to receive an impression of the stamp canceling means whereby the bank register cards will correspond with the deposits indicated on the depositors' cards.

In testimony whereof I affix my signature in the presence of two witnesses.

THOMAS HENRY COOK.

Witnesses:
MARY MUNROE,
W. J. DOUGHERTY.

Copies of this patent may be obtained for five cents each, by addressing the "Commissioner of Patents, Washington, D. C."